United States Patent [19]

Shimada et al.

[11] Patent Number: 4,775,023

[45] Date of Patent: Oct. 4, 1988

[54] RIDERLESS VEHICLE STEERING CONTROL APPARATUS

[75] Inventors: Kazuyuki Shimada, Aichi; Susumu Yoshida, Gifu, both of Japan

[73] Assignee: Kabushiki Kaisha Meidensha, Tokyo, Japan

[21] Appl. No.: 2,007

[22] Filed: Jan. 12, 1987

[30] Foreign Application Priority Data

Jan. 17, 1986 [JP] Japan .................................. 61-7299

[51] Int. Cl.⁴ ............................................ B60K 29/00
[52] U.S. Cl. .................................................. 180/168
[58] Field of Search ...................... 180/167, 168, 169; 364/424, 447, 449, 450; 318/587

[56] References Cited

U.S. PATENT DOCUMENTS 3,881,568 5/1975 Ando et al. .......................... 180/168

Primary Examiner—John J. Love
Assistant Examiner—Richard Camby

Attorney, Agent, or Firm—Bachman & LaPointe

[57] ABSTRACT

A vehicle steering control apparatus for following a riderless vehicle over a reference path defined by a guide tape installed on a floor. A sensor assembly, mounted on the vehicle bottom surface, includes a plurality of sensor units arranged on a line. Each the sensor unit includes a downward-facing light emission diode operable to emit a light ray and a downward-facing photodiode sensitive to a light ray received thereon for generating a sensor signal corresponding to the sensed light intensity. The sensor signal from each the sensor unit is applied to a control circuit which provides a command signal corresponding to the received sensor signals. The riderless vehicle includes a steering device responsive to the command signal for correcting vehicle steering to aline the vehicle sufficient well over the reference path. The control apparatus includes a drive circuit for driving the sensor units in a time-sharing fashion causing sequential light emission of the light emission diodes in a predetermined sequence.

7 Claims, 2 Drawing Sheets

RIDERLESS VEHICLE STEERING CONTROL APPARATUS

BACKGROUND OF THE INVENTION

This invention relates to a vehicle steering control apparatus for following a riderless vehicle along a reference path provided on a floor, a ground, or other flfat plates.

Riderless vehicles steering control apparatus have been employed for correcting vehicle steering to align the riderless vehicle suficient well over prescribed reference paths defined by guide tapes by the aid of an optical sensor assembly operable to measure momentary deviations of the riderless vehicle from the reference path. The optical sensor assembly includes a plurality of sensor units arranged on a line, each sensor unit including a downward-facing light emission diode operable to emeit a light ray and a downward-facing photodiode sensitive to the light ray reflected from the floor or the guide tape. With such conventional apparatus, however, it is necessary to avoid light interference by arranging one sensor unit out of the reflected light area resulting from a light ray emitted from another sensor unit. This has been the primary limitation on optical sensor assemblies, and as a result, fine and accurate deviation measurements have not been reliably obtainable in conventional riderless vehicle steering control apparatus. This has been a serious problem particularly for applications to high-speed riderless vehicles.

SUMMARY OF THE INVENTION

Therefore, it is a main object of the invention to provide an improved riderless vehicle steering control apparatus which permits closer arrangement of optical sensor units to provide more fine and accurate measurements of deviations of a riderless vehicle from a reference path.

Another object of the invention is to provide an improved riderless vehicle steering control apparatus which can control riderless vehicle steering with greater accuracy.

There is provided, in accordance with the invention, a vehicle steering control apparatus for following a riderless vehicle over a reference path defined by a guide tape installed on a flat plane. The guide tape has a reflection coefficient different from the flat plane. The riderless vehicle has a bottom surface facing downward. A sensor assembly is mounted on the vehicle bottom surface, the sensor assembly including a plurality of sensor units arranged on a line. Each the sensor unit including a downward-facing light emission element operable to emit a light ray and a downward-facing light receipt element sensitive to a light ray received thereon for generating a sensor signal corresponding to the sensed light intensity. The apparatus includes a control circuit responsive to the sensor signal from each the sensor unit for providing a command signal. The vehicle includes steering emans responsive to the command signal for correcting vehicle steering to hold dthe vehicle in alignment over the reference path. The apparatus also includes a drive circuit for driving the sensor units in a time-sharing fashion causing sequential light emission of the light emission elements ina predetermined sequence.

BRIEF DESCRIPTION OF THE DRAWINGS

This invention will be described in greater detail by reference to the following description taken in connection with the accompanying drawings, in which like reference numerals refer to the same or corresponding parts, and wherein.

DETAILED DESCRIPTION OF THE INVETION

Figure 1:
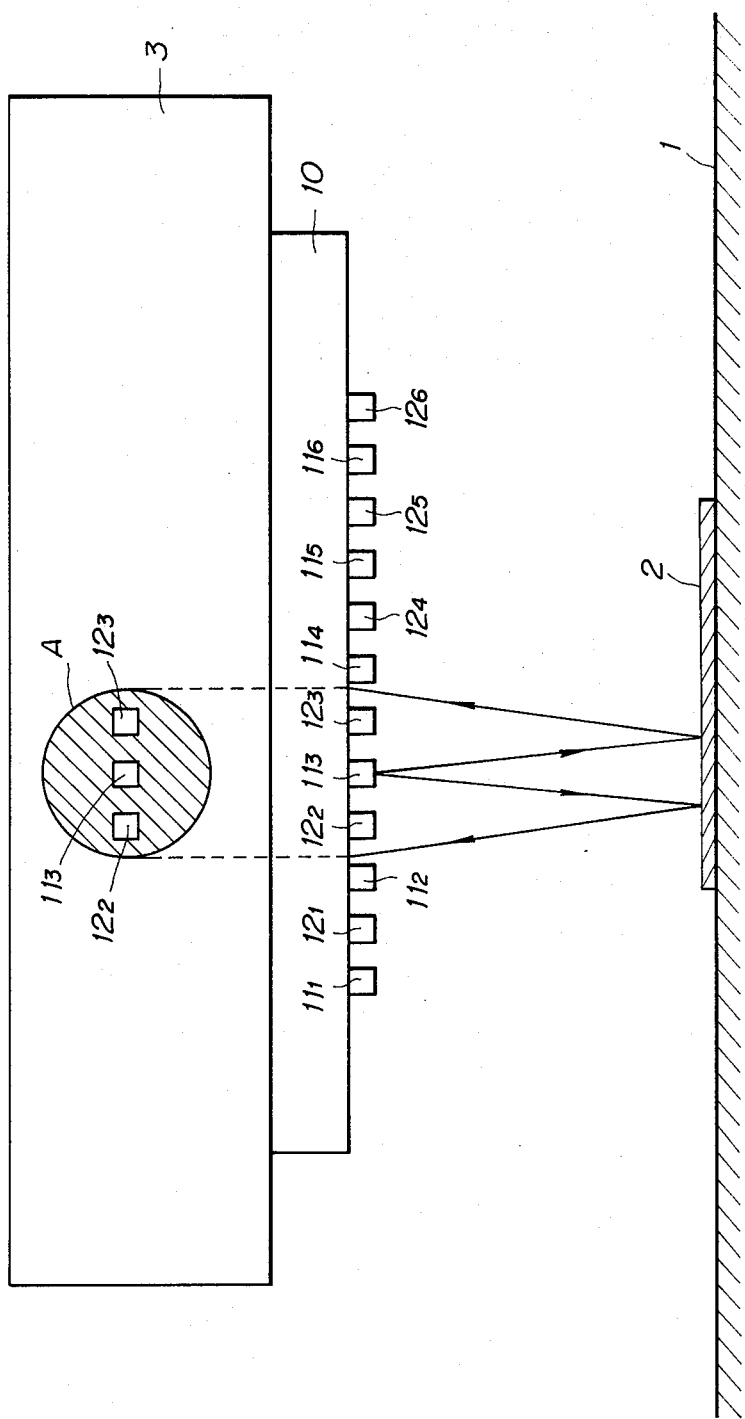
FIG. 1 is a schematic sectional view showing one embodiment of a riderless vehicle steering control apparatus made in accordance with the invention.

With reference to the drawings, wherein like reference numerals refer to like parts, there is shown one embodiment of a riderless vehicle steering control apparatus made in accordance with the invention.

Referring to FIG. 1, a riderless vehicle 3 is shown, in schematic form, as aligned sufficiently well over a guide tape 2 installed on a floor or ground 1. The guide tape has a reflection coefficient different from the floor or ground 1 and it defines a reference path of travel of the riderless vehicle 3.

A sensor assembly includes a plurality of (in the illustrated case six) sensor units each comprised of a light emission element 11 and a light receipt element 12. These sensor units are arranged linearly on a substrate 10. The substrate 10 is mounted on the bottom surface of the riderless vehicle in such a manner that the light emission and receipt elements face downward. The location of the substrate 10 is so that the line on which the light emission and receipt elements are arranged is directed in a direction perpendicular to the vehicle longitudinal direction or perpendicular to the guide tape 2. The light emission element 11 may be taken in the form of a light emission diode operable to emit a light ray such for example as an infrared ray. The light receipt element 12 may be taken in the form of a photodiode sensitive to a reflected light ray for producing a voltage signal corresponding to the intensity of the sensed light ray.

The magnitude of the voltage signal outputted from each sensor unit is dependent on its position with respect to the guide tape 2. Assuming now that the guide tape 2 has a greater reflection coefficient than the floor or ground 1, the light receipt element 12 receives a stronger reflected light ray and produces a greater voltage signal when the sensor unit is above the guide tape 2 than when it is above the floor or ground 1. It is, therefore, apparent that the voltage signals outputted from the respective light receipt elements can constitute data indicative of the deviationof the riderless vehicle 3 from the guide tape 2. Such data are converted into a command signal for application to a vehicle steering device effective to correct vehicle steering in a manner to bring the riderless vehicle into sufficient alignment over the guide tape 2.

In FIG. 1, the hatched area A indicates a reflected light area resulting from a light ray emitted from a light emission $11_3$. It can be seen that two light receipt elements $12_2$ and $12_3$ adjacent the light emission element $11_3$ are positioned in the light area A.

Figure 2:
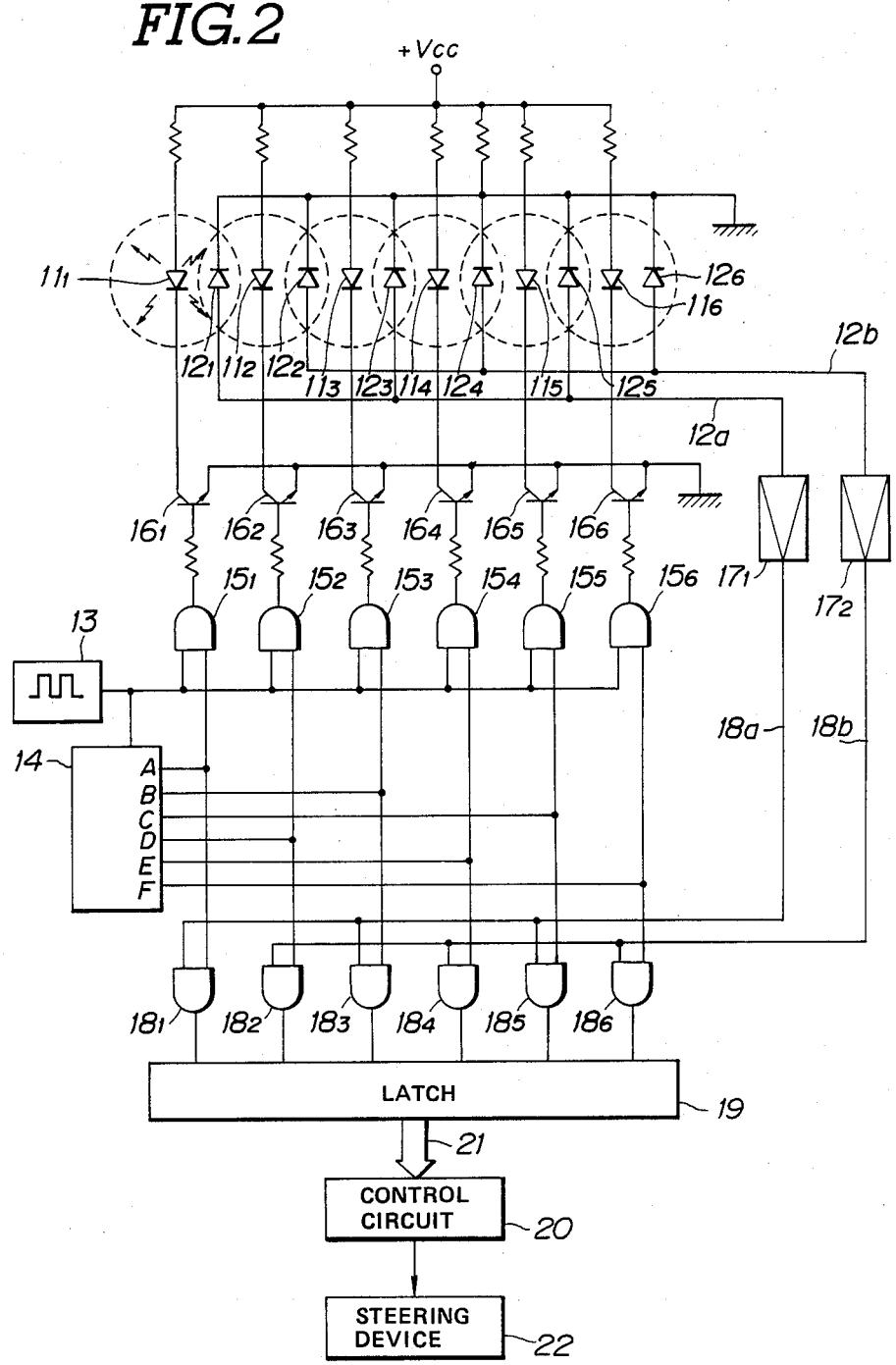
FIG. 2 is a circuit diagram showing the detail of the riderless vehicle steering control apparatus.

Referring to FIG. 2, the reference numeral 13 designates a pulse generator which produces a clock pulse signal to a timing control circuit 14. The timing control circuit 14 generates timing pulses in sequence at its output terminals A to F in synchronism with the clock pulse signal from the pulse generator 13. The timing control circuit 14 produces a timing pulse with a predetermined number of clock pulses from the pulse generator 13. The sequence of order of occurrence of the timing pulses is as follows: Terminal A, terminal B, terminal C, terminal D, terminal E, and terminal F.

The output terminal A is connected to one input of an AND-gate $15_1$ having another input coupled to the pulse generator 13. The output of the AND-gate $15_1$ is coupled through a resistor to a transistor $16_1$. The transistor $16_1$ changes to its conduction state causing the light emission element $11_1$ to emit a light ray when the output of the AND-gate $15_1$ rises to a logic level upon simultaneous occurrence of timing and clock pulses at its respective inputs. Similarly, the output terminal B is connected to one input of an AND-gate $15_3$ having another input coupled to the pulse generator 13. The output of the AND-gate $15_3$ is coupled through a resistor to a transistor $16_3$. The transistor $16_3$ changes to its conduction state causing the light emission element $11_3$ to emit a light ray when the output of the AND-gate $15_3$ rises to a logic 1 level upon simultaneous occurrence of timing and clock pulses at its respective input. The output terminal C is connected to one input of an AND-gate $15_5$ having another input coupled to the pulse generator 13. The output of the AND-gate $15_5$ is coupled through a resistor to a transistor $16_5$. The transistor $16_5$ changes to its conduction state causing the light emission element $11_5$ to emit a light ray when the output of the AND-gate $15_5$ rises to a logic 1 level upon simultaneous occurrence of timing and clock pulses at its respective input. The output terminal D is connected to one input of an AND-gate $15_2$ having another input coupled to the pulse generator 13. The output of the AND-gate $15_2$ is coupled through a resistor to a transistor $16_2$. The transistor $16_2$ changes to its conduction state causing the light emission element $11_2$ to emit a light ray when the output of the AND-gate $15_2$ rises to a logic 1 level upon simultaneous occurrence of timing and clock pulses at its respective input. The output terminal E is connected to one input of an AND-ate $15_4$ having another input coupled to the pulse generator 13. The output of the AND-gate $15_4$ is coupled through a resistor to a transistor $16_4$. The transistor $16_4$ changes to its conduction state causing the light emission element $11_4$ to emit a light ray when the output of the AND-gate $15_4$ rises to a logic 1 level upon simultaneous occurrence of timing and clock pulses at its respective input. The output terminal F is connected to one input of an AND-gate $15_6$ having another input coupled to the pulse generator 13. the output of the AND-gate $15_6$ is coupled through a resistor to a resistor $16_6$. The transistor $16_6$ changes to its conduction state causing the light emission element $11_6$ to emit a light ray when the output of the AND-gate $15_6$ rises to a logic 1 level upon simultaneous occurrence of timing and clock pulses at its respective input. Consequently, the light emission elements are driven in a time-sharing fashion to emit light rays in the following order: Element $11_1$, element $11_3$, element $11_5$, element $11_2$, element $11_4$, and element $11_6$.

In FIG. 2, each of the broken circles indicates a reflected light area resulting from a light ray emitted from a light emission element.

The odd-numbered light receipt elements $12_1$, $12_3$ and $12_5$, which are connected in parallel, are connected through a common line $12a$ to a first signal processor circuit $17_1$. The first signal processor circuit $17_1$, which may be considered to include an amplifier, a comparator and a waveform shaper, converts the voltage signal developed on the line $12a$ into a digital signal which has a logic 0 level when the voltage signal is smaller than a predetermined value and a logic 1 level when the voltage signal is equal to or greater than the predetermined value. The output of the first signal processor circuit $17_1$ is coupled through a common line $18a$ to one inputs of odd-numbered AND-gates $18_1$, $18_3$ and $18_5$. The AND-gate $18_1$ has another input connected to the output terminal A of the timing control circuit 14 and an output coupled to a latch circuit 19. The AND-gate $18_3$ has another input connected to the output terminal B of the timing control circuit 14 and an output coupled to the latch circuit 19. The AND-gate $18_5$ has another input connected to the output terminal C of the timing control circuit 14 and an output coupled to the latch circuit 19.

Similarly, the even-numbered light receipt elements $12_2$, and $12_4$ and $12_6$, which are connected in parallel, are connected through a common line $12b$ to a second signal processor circuit $17_2$. The second signal processor circuit $17_2$, which may be similar to the first signal processor circuit $17_1$, processes the voltage signal developed on the line $12b$ to produce a digital signal which has a logic 0 level when the voltage signal is smaller than the predetermined value and a logic 1 level when the voltage signal is equal to or greater than the predetermined value. The output of the second signal processor circuit $17_2$ is coupled through a common line $18b$ to one inputs of even-numbered AND-gates $18_2$, $18_4$ and $18_6$. The AND-gate $18_2$ has another input connected to the output terminal D of the timing control circuit 14 and an output coupled to the latch circuit 19. The AND-gate $18_4$ has another input connected to the output terminal E of the timing control circuit 14 and an output coupled to the latch circuit 19. The AND-gate $18_6$ has another input connected to the output terminal F of the timing control circuit 14 and an output coupled to the latch circuit 19.

The latch circuit 19 serves to hold the digital values fed thereto respectively from the AND gates $18_1$ through $18_6$ in a predetermined period. The data latched in the latch circuit 19 are transferred at a desired time to a control circuit 20 through a 6-bit data bus 21. The control circuit 20, which may employ a digital computer, is operable to calculate a value for vehicle steering angle required to correct vehicle steering. The calculated value is fed to a vehicle steering device 22 which thereby aligns the riderless vehicle sufficient well over the guide tape 2.

The operation is as follows: It is now assumed that the tape guide 2 has a greater reflection coefficient than the floor 1.

First of all, the timing control circuit 14 produces a timing pulse with a predetermined pulse width at the output terminal A. This timing pulse is applied to open the AND-gate $15_1$. This permits application of the clock pulses to turn the transistor $16_1$ to its conduction state driving the light emission element $11_1$ to emit a light ray. The emitted light ray is reflected on the floor 1 or the guide tape 2 and then received by the light receipt element $12_1$ produces a voltage signal which is applied through the line $12a$ to the first signal processor circuit $17_1$. The first signal processor circuit $17_1$ converts it into a digital signal which has a logic 0 level when the voltage signal is smaller than the predetermined value and a logic 1 level when the voltage signal is equal to or greater than the predetermined value. This digital signal appears on the line 18a. Since the timing pulse is also applied fro the timing control circuit output terminal A to open the AND-gate $18_1$, the digital signal is fed through the AND-gate $18_1$ to be latched in the latch circuit 19. The sensor unit comprised of the light emission and receipt elements $11_1$ and $12_1$ is above the floor 1 if the latched value is "0" and it is above the guide tape 2 if the latched value is "1". This portion of the opeational cycle is terminated when the timing pulse changes to its low level at the output terminal A of the timing control circuit 14. The digital signal is latched in the latch circuit 19 until the operational cycle is terminated.

When a predetermined number of clock pulses occurs after the occurrence of the timing pulse at the output terminal A, the timing conctrol circuit 14 produces a timing pulse with a predetermined pulse width at a athe output terminal B. This timing pulse is applied to open the AND-gate $15_3$. This permits application of the clock pulses to turn the transistor $16_3$ to its conduction state driving the liht emission element $11_3$ to emit a light ray. The emitted light ray is reflected on the floor 1 or the guide tape 2 and then received by the light receipt element $12_3$. As a result, the light receipt element $12_3$ produces a voltage signal which is applied through the line 12a to the first signal processor circuit $17_1$. It is to be noted that the voltage signal, which was developed on the line 12a from the light receipt element $12_1$, has disappeared until this time. The first signal processor circuit $17_1$ converts it into a digital signal which has a logic 0 level when the voltage signal is smaller than the predetermined value and a logic 1 level when the voltage signal is equal to or greater than the predetermined value. This digital signal appears on the line 18a. Since the timing pulse is also applied from the timing control circuit output terminal B to open the AND-gate $18_3$, the digital signal is fed through the AND-gate $18_3$ to be latched in the latch circuit 19. The sensor unit comprised of the light emission and receipt elements $11_3$ and $12_3$ is above the floor 1 if the latched value is "0" and it is above the guide tape 2 if the latched value is "1". Although the light receipt element $12_2$ receives the reflected right ray along with the light receipt element $12_3$ to produce a voltage signal on the line 12b, this voltage signal is ignored since eall of the AND-gates are closed except for the AND-gates $18_3$. This portion of the operation cycle is terminated when the timing pulse changes to its low level at the output terminal B of the timing control circuit 14. The digital signal is latched in the latch circuit 19 until the operational cycle is terminated.

Following this, similar operations are repeated for the sensor units $11_5$, $12_5$; the sensor units $11_2$, $12_2$; the sensor units $11_4$, $12_4$; and the sensor units $11_6$, $12_6$ in this order. Upon termination of the operational cycle. the complement of a binary number latched in the latch circuit 19 are transferred through the data bus 21 to the control circuit 20 and then cleared for the next operational cycle. The data bus 21 is comprised of six lines each carrying a bit of information.

For example, if the transferred data represent a binary number "011110", it means that the riderless vehicle 3 is aligned sufficient well over the reference path 2 and the control circuit 20 provides a command to the vehicle steering device 22 in a manner to retain the steering angle as it stands. If the transferred data represent a binary number "001111", it means that the riderless vehicleis deviated tothe right from the reference path and dthe control circuit 20 provides a command to the vehicle steering devide 22 in a manner to change the steering angle in a direction steering the vehicle to the left. If the transferred data represent a vinary number "111100", it means that the riderless vehicle is deviated dto the left from the reference path and the control circuit 20 provides a command to the vehicle steering device 22 in a manner to change the steering angle in a direction steering the riderless vehicle to the right.

According to the invention, a plurality of sensor units arranged on a line are driven in a tme-sharing fashion causing sequential light emission of their light emission elements ina predetermined order. This permits closer arrangement of sensor units to provide more accurate and certain vehicle steering control than can be obtained in the prior art apparatus. This advantageous feature is highly important particularly for applications to high-speed riderless vehicles.

It is preferable to eliminate disturbances resulting from illumination devices or other sources by providing a band-pass filter in each of the signal processor circuits $17_1$ and $17_2$, the band-pass filter having a characteristic to remove components from the sensor sinals except for components having the substantially same frequency as the clock pulse signal from the pulse generator 13.

Although this invention has beene described i conjunction with a specific embodiment thereof, it is evident that many alternatives, modifications and variations will be eapparent to those skilled in the art. For example, although four to six sensor units are shown as corresponding to the guide tape 2, there is no intention in any way to be limited to such a sensor arrangement. In addition, although the sensor units are driven alternately in the illustrated embodiment, it will be appreciated that they may be driven successively if the period of afterglow on the guide tape 2 is short. Accordingly, it is intended to embrace all alternatives, modifications and variations that fall within the scope of the appended claims.

What is claimed is:

1. A vehicle steering control apparatus for following a riderless vehicle along a reference path defined by a guide tape installed on a flat plane, the guide tape having a reflection coefficient different from the flat plane, the riderless vehicle having a bottom surface facing downward, comprising:
   a sensor assembly mounted ond the vehicle bottom surface, the sensor assembly including a plurality of sensor units arranged on a line, each said sensor unit including a downward-facing light emission element and a downward-facing light receipt element sensitive to a light ray received thereon, each said sensor unit being operable to cause the corresponding light emission element to emit a light ray and the corresponding light receipt element to generate a sensor signal corresponding to a sensed light intensity;
   a control circuit responsive to the sensor signal from each said sensor unit for providing a command signal;
   the vehicle including steering means responsive to the command signal for correcting vehicle steering to hold the vehicle in alignment over the reference path; and
   a drive circuit means for operating the respective sensor units in a predetermined sequence.

2. The vehicle steering control apparatus as claimed in claim 1, wherein the sensor units are divided into first and second groups each including sensor units arranged alternately on the line.

3. The vehicle steering control apparatus as claimed in claim 2, wherein the control circuit includes first and second groups of gate circuits corresponding respectively to the sensor units, each first group gate circuit being connected commonly to the light receipt elements of the first group sensor units, each the second group gate circuits being connected commonly to the light receipt elements of the second group sensor units, and means for opening each of the gate circuits in a period during which the corresponding sensor unit is driven.

4. The vehicle steering control apparatus as claimed in claim 3, wherein the drive circuit means includes a pulse generator for producing clock pulses at a predetermined frequency, a timing control circuit connected to the pulse generator for producing a timing pulse having a predetermined pulse width each time a predetermined number of clock pulses occurs, and means responsive to the timing pulse for driving one of the sensor units at the same frequency as the clock pulses in a period corresponding to the pulse width of the timing pulse.

5. The vehicle steering control apparatus as claimed in claim 4, wherein the control circuit includes a band-pass filter for removing components from the sensor signals fed from the first group sensor units except for components having the substantially same frequency as the clock pulses, and a second band-pass filter for removing components from the second group sensor units except for components having the substantially same frequency as the clock pulses.

6. The vehicle steering control apparatus as claimed in claim 1, wherein the drive circuit means includes a pulse generator for producing clock pulses at a predetermined frequency, a timing control circuit connected to the pulse generator for producing a timing pulse having a predetermined pulse width each time a predetermined number of clock pulses occurs, and means responsive to the timing pulse for driving one of the sensor units at the same frequency as the clock pulses in a period corresponding to the pulse width of the timing pulse.

7. The vehicle steering control apparatus as claimed in claim 6, wherein the control circuit includes band-pass filter means for removing components from the sensor signals fed from the respective sensor units except for components having the substantially same frequency as the clock pulses.

* * * * *